(12) United States Patent
Kondapi et al.

(10) Patent No.: US 10,565,032 B2
(45) Date of Patent: Feb. 18, 2020

(54) SYSTEMS AND METHODS FOR TRIGGERING USER INTERFACE TOAST NOTIFICATIONS FOR HYBRID APPLICATIONS

(71) Applicant: Dell Products L.P., Round Rock, TX (US)

(72) Inventors: Srikanth Kondapi, Austin, TX (US); Abu Shaher Sanaullah, Austin, TX (US); Mohit Arora, Leander, TX (US); Alexander Kucheravy, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/003,401

(22) Filed: Jun. 8, 2018

(65) Prior Publication Data

US 2019/0377618 A1 Dec. 12, 2019

(51) Int. Cl.
*G06F 9/54* (2006.01)
*G06F 3/0488* (2013.01)
*G06F 3/0481* (2013.01)
*G06F 3/0484* (2013.01)

(52) U.S. Cl.
CPC ............ *G06F 9/542* (2013.01); *G06F 3/0481* (2013.01); *G06F 3/04842* (2013.01); *G06F 3/04886* (2013.01)

(58) Field of Classification Search
CPC .......................................................... G06F 9/542
USPC .......................................................... 719/318
See application file for complete search history.

(56) References Cited

U.S. PATENT DOCUMENTS

| 2012/0214487 A1* | 8/2012 | Xie ........................ H04W 60/00 455/435.1 |
| 2016/0188387 A1* | 6/2016 | Yang ........................ G06F 9/542 719/318 |
| 2019/0227697 A1* | 7/2019 | Rahman .................. G06F 9/542 |

* cited by examiner

*Primary Examiner* — Andy Ho
(74) *Attorney, Agent, or Firm* — Jackson Walker L.L.P.

(57) ABSTRACT

In accordance with embodiments of the present disclosure, an information handling system may include a processor and a non-transitory computer-readable medium embodying a program of instructions, the program of instructions configured to, when read and executed by the processor: receive a toast notification trigger; and responsive to the toast notification trigger, launch an instance of an application associated with the toast notification trigger and communicate arguments related to a toast notification to the application via an application protocol of the application in order to bridge communication between legacy stack components and containerized stack solutions of an operating system, such that the application issues to the operating system a request to display a toast notification responsive to the toast notification trigger and completes a toast action responsive to user interaction with the toast notification.

15 Claims, 3 Drawing Sheets

SYSTEMS AND METHODS FOR TRIGGERING USER INTERFACE TOAST NOTIFICATIONS FOR HYBRID APPLICATIONS

TECHNICAL FIELD

The present disclosure relates in general to information handling systems, and more particularly, to systems and methods for triggering user interface toast notifications for hybrid applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An application executing upon an operating system of an information handling system may employ toast notifications. A toast notification may comprise a notification that an application displays to a user via a pop-up user interface element called a toast (or banner). Often, the notification can be seen by a user whether a user is active within the application (e.g., user is viewing a window for the application or is otherwise interacting with the application.

Despite usefulness of toast notifications, applications that require a hybrid operating system stack (a Universal Windows Platform graphical user interface but a Windows Win32 backend) often cannot use toast notifications because toasts triggered by Win32 backend may not be able to bridge Universal Windows Platform (UWP) container restrictions. To illustrate, the Microsoft Windows 10 operating system introduced UWP which provides a containerized environment for applications that limits interactions between UWP and classic Win32 applications. Accordingly, using existing approaches, functionality of Windows toast notifications is constrained to either full UWP applications or full legacy Win32 applications. Solutions that require a hybrid stack (UWP GUI and Win32 backend) cannot use toast notifications because the toast triggered by Win32 backend cannot bridge UWP container restrictions. Unavailability of toast notifications for hybrid stack applications may negatively impact user experience.

SUMMARY

In accordance with the teachings of the present disclosure, one or more disadvantages and problems associated with triggering user interface toasts in a hybrid application using existing approaches may be reduced or eliminated.

In accordance with embodiments of the present disclosure, an information handling system may include a processor and a non-transitory computer-readable medium embodying a program of instructions, the program of instructions configured to, when read and executed by the processor: receive a toast notification trigger; and responsive to the toast notification trigger, launch an instance of an application associated with the toast notification trigger and communicate arguments related to a toast notification to the application via an application protocol of the application in order to bridge communication between legacy stack components and containerized stack solutions of an operating system, such that the application issues to the operating system a request to display a toast notification responsive to the toast notification trigger and completes a toast action responsive to user interaction with the toast notification.

In accordance with these and other embodiments of the present disclosure, a method may include receiving a toast notification trigger and responsive to the toast notification trigger, launching an instance of an application associated with the toast notification trigger and communicating arguments related to a toast notification to the application via an application protocol of the application in order to bridge communication between legacy stack components and containerized stack solutions of an operating system, such that the application issues to the operating system a request to display a toast notification responsive to the toast notification trigger and completes a toast action responsive to user interaction with the toast notification.

In accordance with these and other embodiments of the present disclosure, an article of manufacture may include a non-transitory computer readable medium and computer-executable instructions carried on the non-transitory computer readable medium, the instructions readable by a processor, the instructions, when read and executed, for causing the processor to: receive a toast notification trigger; and responsive to the toast notification trigger, launch an instance of an application associated with the toast notification trigger and communicate arguments related to a toast notification to the application via an application protocol of the application in order to bridge communication between legacy stack components and containerized stack solutions of an operating system, such that the application issues to the operating system a request to display a toast notification responsive to the toast notification trigger and completes a toast action responsive to user interaction with the toast notification.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
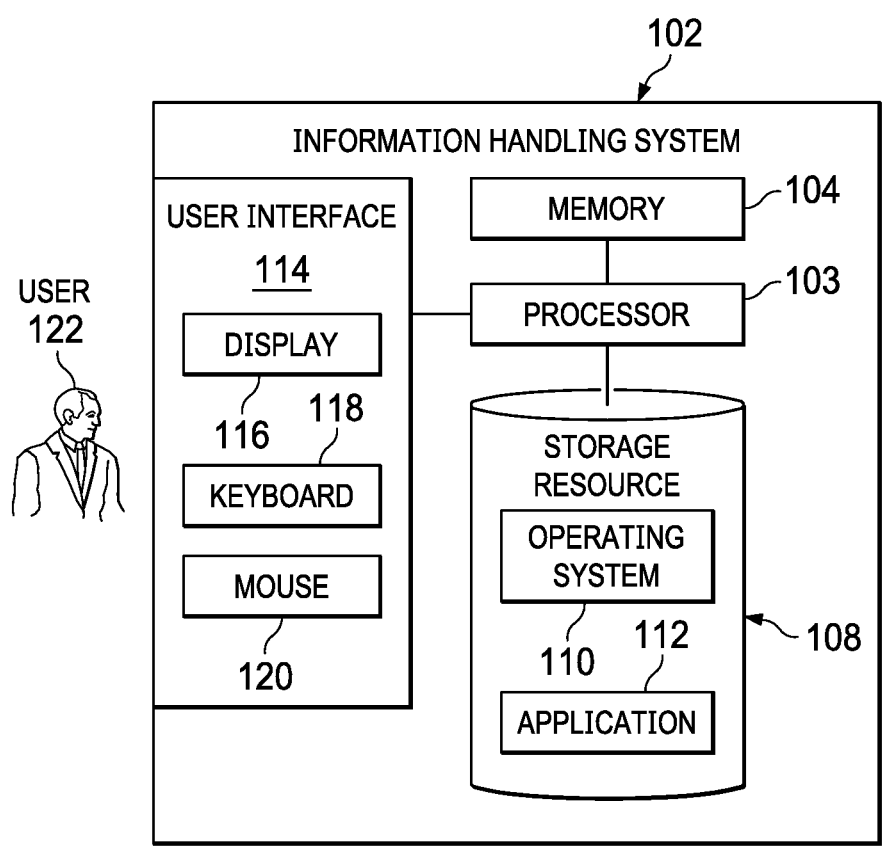
FIG. 1 illustrates a block diagram of selected components of an example information handling system, in accordance with embodiments of the present disclosure.
Figure 2:
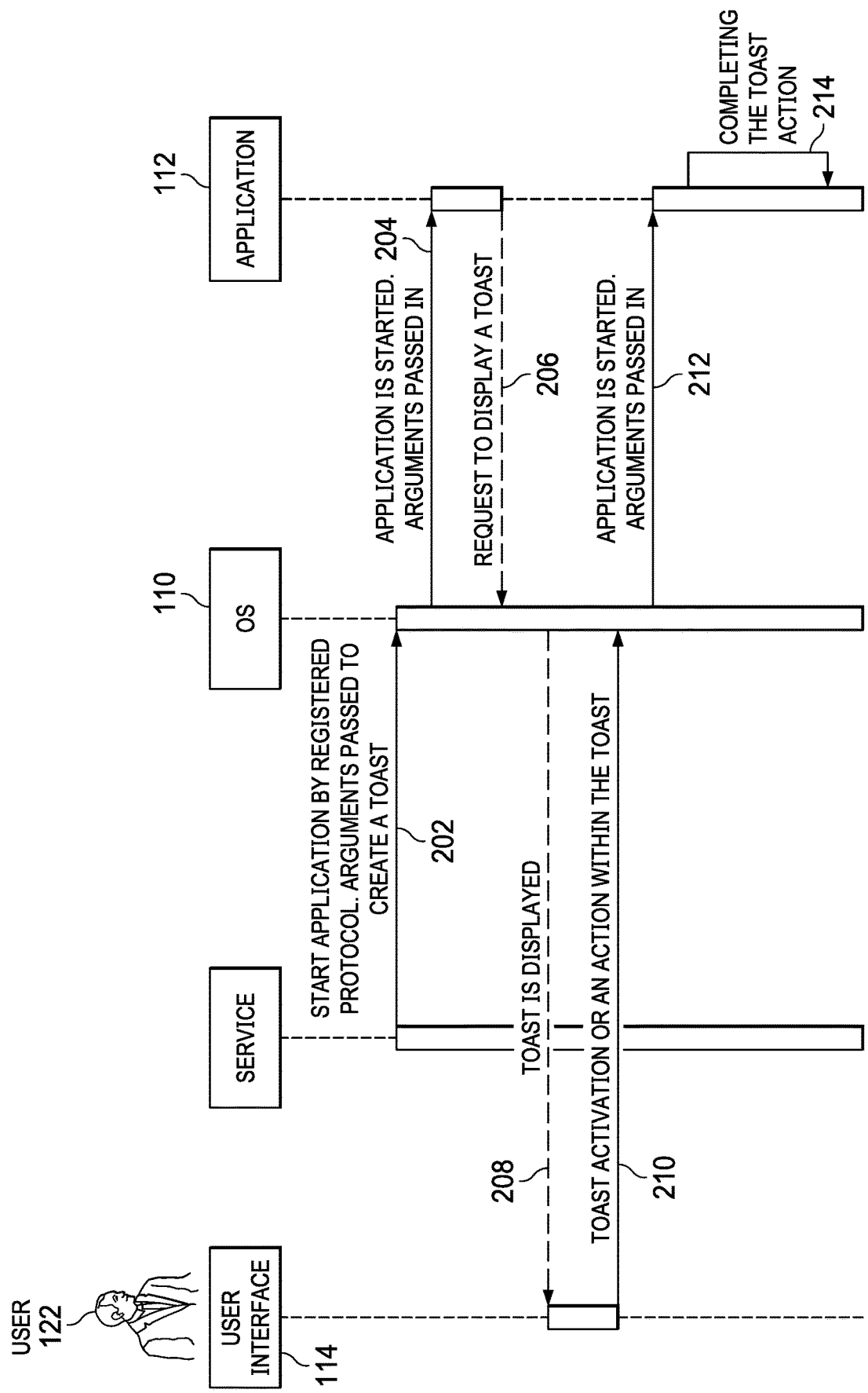
FIG. 2 illustrates a flow chart of an example method for triggering user interface notifications for hybrid applications when no instances of the hybrid application is executing, in accordance with embodiments of the present disclosure.
Figure 3:
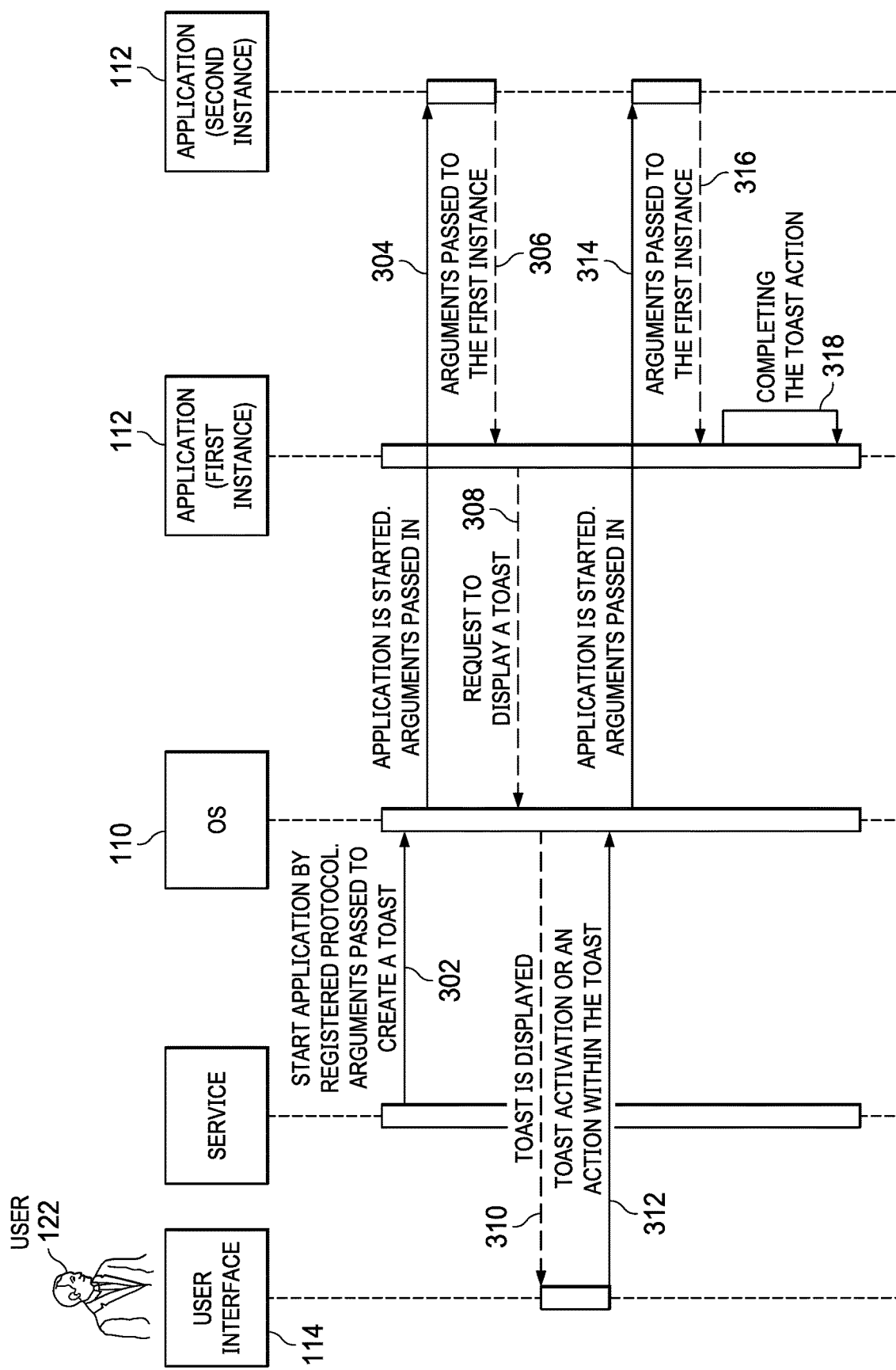
FIG. 3 illustrates a flow chart of an example method for triggering user interface notifications for hybrid applications when an instance of the hybrid application are executing, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of selected components of an example information handling system 102, in accordance with embodiments of the present disclosure. In certain embodiments, information handling system 102 may comprise a personal computer (e.g., a desktop computer or a portable computer). In these and other embodiments, information handling system 102 may comprise a mobile device (e.g., smart phone, a tablet computing device, a handheld computing device, a personal digital assistant, or any other device that may be readily transported on a person of a user of such mobile device).

As depicted in FIG. 1, information handling system 102 may include a processor 103, a memory 104 communicatively coupled to processor 103, a storage resource 108 communicatively coupled to processor 103, and a user interface 114 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in its memory 104, storage resource 108, and/or another component of information handling system 102.

Memory 104 may be communicatively coupled to its associated processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Storage resource 108 may comprise a system, device, or apparatus configured to store data. A storage resource 108 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 108 may include one or more storage enclosures configured to hold and/or power one or more of such devices. In the embodiments represented by FIG. 1, storage resource 108 may reside within its associated information handling system 102. However, in other embodiments, storage resource 108 may reside external to its associated information handling system 102 (e.g., may be coupled to information handling system 102 via a network).

As shown in FIG. 1, a storage resource 108 may have stored thereon an operating system 110 and an application 112.

Operating system 110 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by operating system 110. Active portions of operating system 110 may be transferred to memory 104 (e.g., from storage resource 108) for execution by processor 103.

Application 112 may comprise any program of executable instructions, or aggregation of programs of executable instructions, configured to, when executed by processor 103, cause information handling system 102 to perform functionality defined by the executable instructions. In operation, application 112 may be transferred to memory 104 (e.g., from storage resource 108) for execution on top of operating system 110 on processor 103. In some embodiments, application 112 may comprise a hybrid application in that it has user interface portions that execute and display in accordance with a containerized operating system environment (e.g., UWP) of operating system 110 and backend portions that execute in accordance with a legacy operating system environment (e.g., Win32) of operating system 110.

User interface 114 may comprise any instrumentality or aggregation of instrumentalities by which a user 122 may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to user 122 (e.g., via a display device, speaker, and/or other data output device). As shown in FIG. 1, user interface 114 may include one or more of a display 116, a keyboard 118, and a mouse 120.

Display 116 may comprise any suitable system, device, or apparatus configured to display human-perceptible graphical data and/or alphanumeric data to a user 122. For example, in some embodiments, display 116 may comprise a liquid crystal display. In these and other embodiments, display 116 may include a touch screen allowing user 122 to interact with and provide input to operating system 102 via display 116.

Keyboard 118 may comprise a typewriter-style device or similar device having an arrangement of buttons or keys to act as a mechanical lever and/or electronic switch to allow user 122 to interact with and provide input to operating system 102 by depressing or otherwise activating such buttons or keys.

Mouse 120 may comprise a hand-held pointing device that detects two-dimensional motion relative to a surface, wherein such motion is typically translated into the motion of a pointer on a display (e.g., display 116), which allows a smooth control of a graphical user interface displayed to the display. In some embodiments, pointing devices other than a mouse (e.g., trackpad, trackball, etc.) may be used in addition to or in lieu of mouse 120.

In addition to processor 103, memory 104, storage resource 108, and user interface 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

FIG. 2 illustrates a flow chart of an example method 200 for triggering user interface notifications for hybrid applications when no instances of the hybrid application are executing, in accordance with embodiments of the present disclosure. As noted above, teachings of the present disclosure may be implemented in a variety of configurations of information handling system 102. As such, the preferred initialization point for method 200 and the order of the steps comprising method 200 may depend on the implementation chosen.

At step 202, a service of operating system 110 (e.g., a Windows NT service) may, responsive to detecting a toast trigger condition, communicate with operating system 110 via a registered protocol with a request to launch application 112 associated with the toast notification. For example, the service may use a protocol uniform reference indicator to encode a state machine representing toast notification context. Such application state data may be passed as arguments from the service to operating system 110.

At step 204, operating system 110 may launch application 112 and pass the arguments including the application state data to application 112. In response, at step 206, application 112 may issue a request to operating system 110 to create and display the toast notification. After completion of step 206, application 112 may terminate.

At step 208, operating system 110 may display the toast notification to user interface 114. At step 210, operating system 110 may receive an indication of a user interaction (e.g., clicking of a user interface button on display 116 of user interface 114) with the toast notification. In response, at step 212, operating system 110 may launch application 112 and pass arguments regarding the user interaction with the toast notification to application 112. At step 214, application 112 may complete a toast action in accordance with the arguments passed to it from operating system 110. After completion of step 214, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof, and/or any other system operable to implement method 200. In certain embodiments, method 200 may be implemented partially or fully in software and/or firmware embodied in computer-readable media.

FIG. 3 illustrates a flow chart of an example method 300 for triggering user interface notifications for hybrid applications when an instance of the hybrid application is executing, in accordance with embodiments of the present disclosure. As noted above, teachings of the present disclosure may be implemented in a variety of configurations of information handling system 102. As such, the preferred initialization point for method 300 and the order of the steps comprising method 300 may depend on the implementation chosen.

At step 302, a service of operating system 110 (e.g., a Windows NT service) may, responsive to detecting a toast trigger condition, communicate with operating system 110 via a registered protocol with a request to launch a second instance of application 112 associated with the toast notification. For example, the service may use a protocol uniform reference indicator to encode a state machine representing toast notification context. Such application state data may be passed as arguments from the service to operating system 110.

At step 304, operating system 110 may launch a second instance of application 112 and pass the arguments including the application state data to the second instance of application 112. In response, at step 306, the second instance of application 112 may pass the arguments to a first instance of application 112 which was already executing at the time of the toast trigger condition. After completion of step 306, the second instance of application 112 may terminate. At step 308, the first instance of application 112 may issue a request to operating system 110 to create and display the toast notification.

At step 310, operating system 110 may display the toast notification to user interface 114. At step 312, operating system 110 may receive an indication of a user interaction (e.g., clicking of a user interface button on display 116 of user interface 114) with the toast notification. In response, at step 314, operating system 110 may launch a second instance of application 112 and pass arguments regarding the user interaction with the toast notification to the second instance of application 112.

In response, at step 316, the second instance of application 112 may pass the arguments to the first instance of application 112. After completion of step 316, the second instance of application 112 may terminate. At step 318, the first instance of application 112 may complete a toast action in accordance with the arguments passed to it from operating system 110. After completion of step 318, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof, and/or any other system operable to implement method 300. In certain embodiments, method 300 may be implemented partially or fully in software and/or firmware embodied in computer-readable media.

Using the systems and methods described above, a generic notification framework is created which addresses applications executing on pure containerized stacks (e.g., UWP), applications executing on pure legacy stacks (e.g., Win32), and applications executing on hybrid stacks. In addition, using the systems and methods described above, the use of an application protocol is extended to enable a broker to communicate between legacy stack components and containerized stack solutions using uniform resource identifier schema in a non-traditional format to transport notification context and/or data. Furthermore, using the systems and methods described above, an application protocol (e.g., uniform resource identifier schema) may be used to extend an operating system notification framework to bridge legacy stack and containerized stack component interaction for toast notifications.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system, comprising:
   a processor; and
   a non-transitory computer-readable medium embodying a program of instructions, the program of instructions configured to, when read and executed by the processor:
   receive a toast notification trigger; and
   responsive to the toast notification trigger, launch an instance of an application associated with the toast notification trigger and communicate arguments related to a toast notification to the application via an application protocol of the application in order to bridge communication between legacy stack components and containerized stack solutions of an operating system, such that the application issues to the operating system a first request to display the toast notification responsive to the toast notification trigger and completes a toast action responsive to user interaction with the toast notification.

2. The information handling system of claim 1, wherein the instructions are configured to, when executed by the processor, responsive to determining that no instance of the application is executing on the operating system:
   communicate an indication from a service of the operating system to the operating system for launching the instance and passing arguments associated with the toast notification using the application protocol;
   launch the instance and pass the arguments to the application by the operating system using the application protocol;
   receive a second request from the application to display the toast notification in accordance with the arguments; and
   display the toast notification to a display in accordance with the second request.

3. The information handling system of claim 2, wherein the instructions are further configured to, when executed by the processor:
   receive an indication of user interaction with the toast notification; and
   pass arguments associated with the user interaction to the application by the operating system using the application protocol, such that the application completes the toast action in accordance with the user interaction.

4. The information handling system of claim 1, wherein the instructions are configured to, when executed by the processor, responsive to determining that a first instance of the application is executing on the operating system:
   communicate an indication from a service of the operating system to the operating system for launching a second instance of the application and passing arguments associated with the toast notification using the application protocol;

launch the second instance and pass the arguments to the second instance of the application by the operating system using the application protocol, such that the second instance passes the arguments to the first instance;

receive a request from the first instance of the application to display the toast notification in accordance with the arguments; and display the toast notification to a display in accordance with the request.

5. The information handling system of claim 4, wherein the instructions are further configured to, when executed by the processor:

receive an indication of user interaction with the toast notification; and launch an additional instance of the application and pass arguments associated with the user interaction to another application by the operating system using the application protocol, such that the additional instance passes the arguments associated with the user interaction to the first instance and the first instance completes the toast action in accordance with the user interaction.

6. A method, comprising:

receiving a toast notification trigger; and responsive to the toast notification trigger, launching an instance of an application associated with the toast notification trigger and communicating arguments related to a toast notification to the application via an application protocol of the application in order to bridge communication between legacy stack components and containerized stack solutions of an operating system, such that the application issues to the operating system a first request to display the toast notification responsive to the toast notification trigger and completes a toast action responsive to user interaction with the toast notification.

7. The method of claim 6, further comprising, responsive to determining that no instance of the application is executing on the operating system:

communicating an indication from a service of the operating system to the operating system for launching the instance and passing arguments associated with the toast notification using the application protocol;

launching the instance and passing the arguments to the application by the operating system using the application protocol;

receiving a second request from the application to display the toast notification in accordance with the arguments; and displaying the toast notification to a display in accordance with the second request.

8. The method of claim 7, further comprising:

receiving an indication of user interaction with the toast notification; and passing arguments associated with the user interaction to the application by the operating system using the application protocol, such that the application completes the toast action in accordance with the user interaction.

9. The method of claim 6, further comprising, responsive to determining that a first instance of the application is executing on the operating system:

communicating an indication from a service of the operating system to the operating system for launching a second instance of the application and passing arguments associated with the toast notification using the application protocol;

launching the second instance and passing the arguments to the second instance of the application by the operating system using the application protocol, such that the second instance passes the arguments to the first instance;

receiving a request from the first instance of the application to display the toast notification in accordance with the arguments; and displaying the toast notification to a display in accordance with the request.

10. The method of claim 9, further comprising:

receiving an indication of user interaction with the toast notification; and launching an additional instance of the application and passing arguments associated with the user interaction to another application by the operating system using the application protocol, such that the additional instance passes the arguments associated with the user interaction to the first instance and the first instance completes the toast action in accordance with the user interaction.

11. An article of manufacture comprising:

a non-transitory computer readable medium; and computer-executable instructions carried on the non-transitory computer readable medium, the instructions readable by a processor, the instructions, when read and executed, for causing the processor to:

receive a toast notification trigger; and responsive to the toast notification trigger, launch an instance of an application associated with the toast notification trigger and communicate arguments related to a toast notification to the application via an application protocol of the application in order to bridge communication between legacy stack components and containerized stack solutions of an operating system, such that the application issues to the operating system a first request to display the toast notification responsive to the toast notification trigger and completes a toast action responsive to user interaction with the toast notification.

12. The article of claim 11, the instructions for further causing the processor to, responsive to determining that no instance of the application is executing on the operating system:

communicate an indication from a service of the operating system to the operating system for launching the instance and passing arguments associated with the toast notification using the application protocol;

launch the instance and pass the arguments to the application by the operating system using the application protocol;

receive a second request from the application to display the toast notification in accordance with the arguments; and display the toast notification to a display in accordance with the second request.

13. The article of claim 12, the instructions for further causing the processor to:

receive an indication of user interaction with the toast notification; and pass arguments associated with the user interaction to the application by the operating system using the application protocol, such that the application completes the toast action in accordance with the user interaction.

14. The article of claim 11, the instructions for further causing the processor to, responsive to determining that a first instance of the application is executing on the operating system:
- communicate an indication from a service of the operating system to the operating system for launching a second instance of the application and passing arguments associated with the toast notification using the application protocol;
- launch the second instance and pass the arguments to the second instance application by the operating system using the application protocol, such that the second instance passes the arguments to the first instance;
- receive a request from the first instance of the application to display the toast notification in accordance with the arguments; and
- display the toast notification to a display in accordance with the request.

15. The article of claim 14, the instructions for further causing the processor to, when executed by the processor:
- receive an indication of user interaction with the toast notification; and
- launch an additional instance of the application and pass arguments associated with the user interaction to another application by the operating system using the application protocol, such that the additional instance passes the arguments associated with the user interaction to the first instance and the first instance completes the toast action in accordance with the user interaction.

* * * * *